(12) United States Patent  
McCary, Sr.

(10) Patent No.: US 9,074,775 B2  
(45) Date of Patent: Jul. 7, 2015

(54) GRILL AND FIREPLACE COMBINATION WITH PORTABILITY OPTIONS

(71) Applicant: John Milner McCary, Sr., Birmingham, AL (US)

(72) Inventor: John Milner McCary, Sr., Birmingham, AL (US)

( * ) Notice: Subject to any disclaimer, the term of this patent is extended or adjusted under 35 U.S.C. 154(b) by 156 days.

(21) Appl. No.: 13/986,487

(22) Filed: May 8, 2013

(65) Prior Publication Data

US 2014/0331986 A1    Nov. 13, 2014

(51) Int. Cl.
*F24B 1/182*    (2006.01)
*F24B 1/20*    (2006.01)

(52) U.S. Cl.
CPC ................. *F24B 1/182* (2013.01); *F24B 1/207* (2013.01)

(58) Field of Classification Search
CPC .................................. F24B 1/207; F24B 1/182
USPC .............. 99/339, 340, 357; 126/4, 1 R, 25 R; 224/502, 504, 505, 519
See application file for complete search history.

(56) References Cited

U.S. PATENT DOCUMENTS

| | | | | |
|---|---|---|---|---|
| D46,396 S | * | 9/1914 | Hsu | D8/97 |
| 4,630,592 A | * | 12/1986 | Larabie | 126/4 |
| 5,325,841 A | * | 7/1994 | Hooper, Sr. | 126/25 R |
| 5,456,564 A | * | 10/1995 | Bianchini | 414/462 |
| 6,058,832 A | * | 5/2000 | Fountain | 99/446 |
| 6,186,729 B1 | * | 2/2001 | Sargent | 414/462 |
| 6,321,640 B1 | * | 11/2001 | Tseng | 99/340 |
| 6,748,939 B1 | * | 6/2004 | Gober | 126/25 R |
| 2005/0121018 A1 | * | 6/2005 | Rosen | 126/9 R |
| 2009/0308373 A1 | * | 12/2009 | Scott et al. | 126/25 R |
| 2010/0258106 A1 | * | 10/2010 | Simms, II | 126/25 R |
| 2013/0264367 A1 | * | 10/2013 | Hill | 224/413 |

* cited by examiner

*Primary Examiner* — Sarah B McPartlin

(57) ABSTRACT

A combination manufactured grill and fireplace/cooker with an upper lidded grill cooking grated area and a lower fuel burning fireplace/cooking area. The fireplace open section, where access doors can be placed, gives access to place, attend and remove fuel burning sources, including gas logs and food items. When sealable fireplace door(s) are closed the grill/fireplace cooker can control the intake and outtake of air. The use of the fireplace and grill cooker can be used simultaneously but the insulation properties and control of air flow may be reduced when the fireplace section or top lid is constantly opened or kept open.

4 Claims, 4 Drawing Sheets

GRILL AND FIREPLACE COMBINATION WITH PORTABILITY OPTIONS

CROSS-REFERENCE TO RELATED APPLICATIONS

Figure 1:
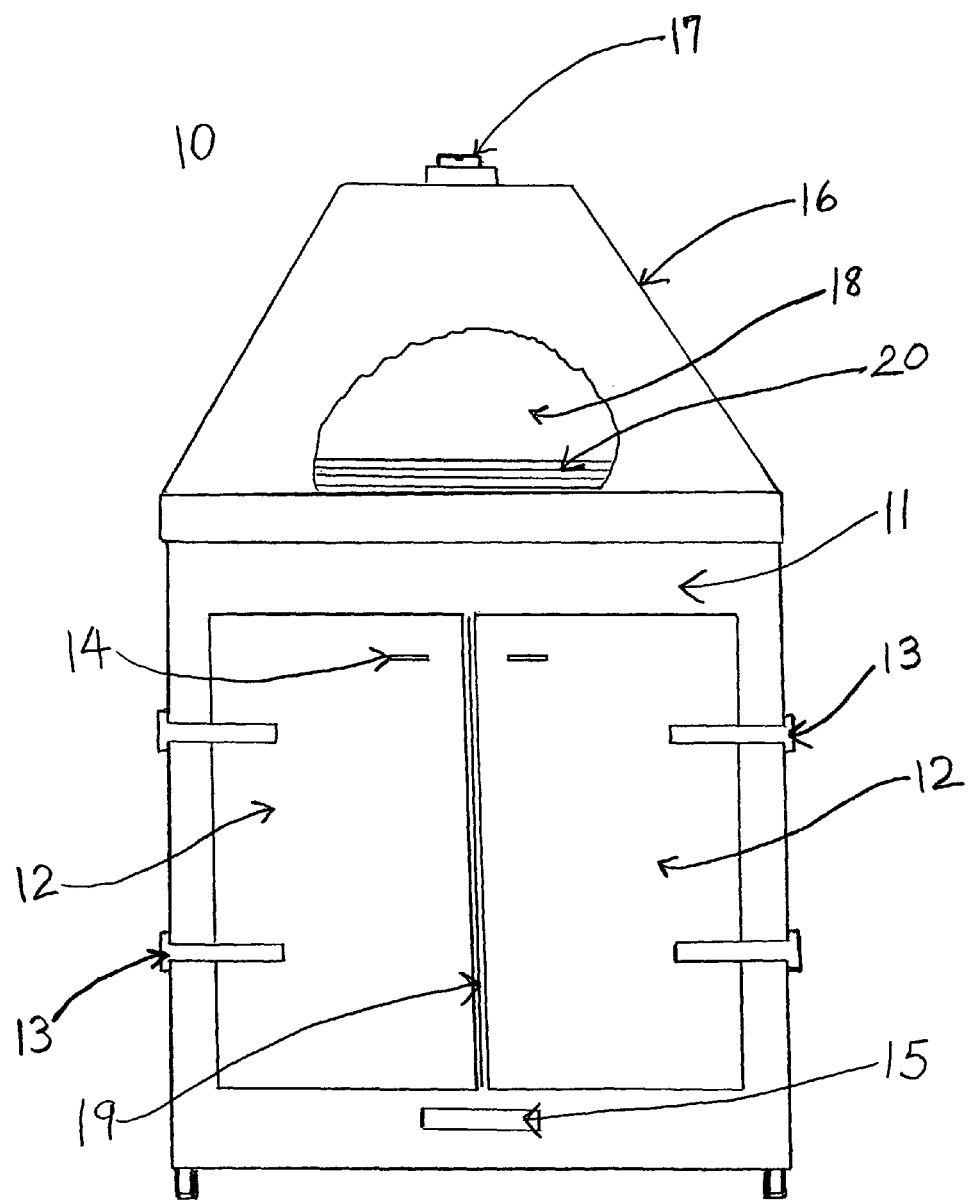

This application has cross-reference to application Ser. No. 13/815,242 filed Feb. 13, 2013

BACKGROUND OF THE INVENTION

1. Field of the Invention

The present invention relates to an insulated, partially or non-insulated outdoor grill style cooker and an outdoor fireplace, and the ability to transport the outdoor grill and fireplace.

2. Description of the Prior Art

Traditional outdoor grills have grated cooking surfaces and a lid that can cover the cooking food to help hold heat in the cooking area. Most outdoor grills are non-insulated with some having the top lid being insulated to retain heat. Many traditional outdoor grills do not control well the flow of air moving into and out of the body of the grill. Some of the moisture and juices of the cooked food may be lost by too much intake and outflow of air. Most traditional grills are not convenient to handle, are difficult to fit into most vehicles, may be quite heavy and/or dirty to move and transport to a new location. Outdoor fireplace style cookers have also been in existence for thousands of years, where primarily food is cooked outside. Outdoor fireplaces have become a desired addition to many homes in recent years where the usage of the fireplace includes a place where friends and family can enjoy the warmth in front of a glowing fire. Combining comfort and warmth, the outdoor fireplace allows one to be outside more months of the year as a gathering spot. One is usually able to cook on the outdoor fireplace with kids enjoying roasting hotdogs, marshmallows or other food items in the open flames. Outdoor fireplace/cookers can also be heavy, cumbersome, dirty and also hard to fit into most vehicles to transport. Outdoor fireplaces are usually made of body components that do not control the intake and outtake of air efficiently, such as grated mesh and cutout sections. Outdoor grills usually burn charcoal or gas but also customarily burn wood pellets. Once the charcoal or other fuel is placed down in the lower section of the grill cooker it is not that easy to access, attend, add or remove the fuel in many outdoor grills, especially once the cooking grill is place on the grill cooker. There is usually no significant horizontal/lateral access to the lower fuel burning section of the outdoor grill cooker. In U.S. Application No. 20050121018 the cooker has the ability to add a fire pit to a grill/smoker assembly but the grill/smoker and the fire pits independent, detachable and variable stacked components are not manufactured permanently as an integrated functional unit. The grill/cooker is not designed to control the flow of air. When the middle fire pit section is added with the smoker section the open mesh construction of the fire pit allows air to flow in and out uncontrolled. There is no cooking performed in the fire pit and neither is there any fire burning fuel directly in the fire pit. There is a need for a manufactured combined outdoor grill and fireplace. The benefits of each could be enjoyed in use individually or the use of the grill cooker and the outdoor fireplace usage can be used simultaneously. The combination grill style cooker and fireplace could have cost and space savings to the user by not having to purchase two separate units plus the possibility of using same burning fuel in same time combination usages. It also would be very beneficial if the combination outdoor grill/fireplace could be designed to be conveniently transported, such as tailgating at football games, other sports events, cookouts and camping, especially without having to dismantle many components of the grill/fireplace cooker.

BRIEF SUMMARY OF THE INVENTION

The present invention is a manufactured together outdoor grill/smoker combined with an outdoor fireplace/cooker. The invention as described in application Ser. No. 13/815,242 is similar to the present invention where there is both a top grill section and a lower fireplace section and the outer walls of each section is ceramic or metal lined insulated and has sealable fireplace access doors to be able to perform as one function as a Kamado style cooker. The present invention combination outdoor grill and fireplace/cooker is manufactured such that the function of each respective usage functions and qualities can be maintained. The fireplace has the option to have air sealable door or doors, non-sealable door(s), 2 or no door(s) on the lower section of the grill/fireplace cooker. With the fireplace door section open burning sources and food can be added, attended to and removed. Food racks or fuel burning holders can be placed in the Lower section of the grill/fireplace cooker. When sealable door(s) are closed the grill/fireplace can become almost, if not air tight with all the cooking functions and capabilities of an air flow controlled grill/fireplace cooker. The use of the fireplace, either just enjoying the warmth and/or cooking in the fireplace, can be performed simultaneously with the use of the top grill but there may be some loss in fuel burning, air and heat control. The increased insulation qualities of the combination outdoor grill and fireplace cooker may enable heat to be maintained, less fuel burned, reduced air intake and may allow the rear and sides of the combination cooker to be fairly close to flammable material, such as wood siding or wood deck. The underneath bottom of the combination grill/fireplace cooker can have an attached trailer hitch receiver/framework that allows the grill/fireplace cooker to be carried by a vehicle's trailer hitch. The outdoor grill/fireplace can be either directly lifted up manually or a "crank-slide" system can be used to attach the grill/fireplace to a vehicle's trailer hitch for transporting. The crank-slide system entails having a "crank-slide tongue" that is connected to the vehicles trailer hitch receiver and extends down at about a forty five degree angle to the other end of the crank-slide tongue which is placed into the grill/fireplace underneath framework receiver. Both ends of the extended tongue have flexible joints. A crank is attached above and to the vehicles receiver and/or to the crank-slide tongue, with the crank's extended wire or strapping attached at an attaching point on the body of the grill/fireplace. The crank pulls the grill/fireplace cooker up the crank-slide tongue to a stopping position where the bottom of the grill/fireplace is horizontal to the ground surface. The crank tongue is then locked in place to secure the grill/fireplace in position for transporting. 25

BRIEF DESCRIPTION OF THE GRILL/FIREPLACE COOKER

FIG. 1 Shows in a front perspective view of the outdoor grill/fireplace cooker with attached fireplace doors closed.

Figure 2:
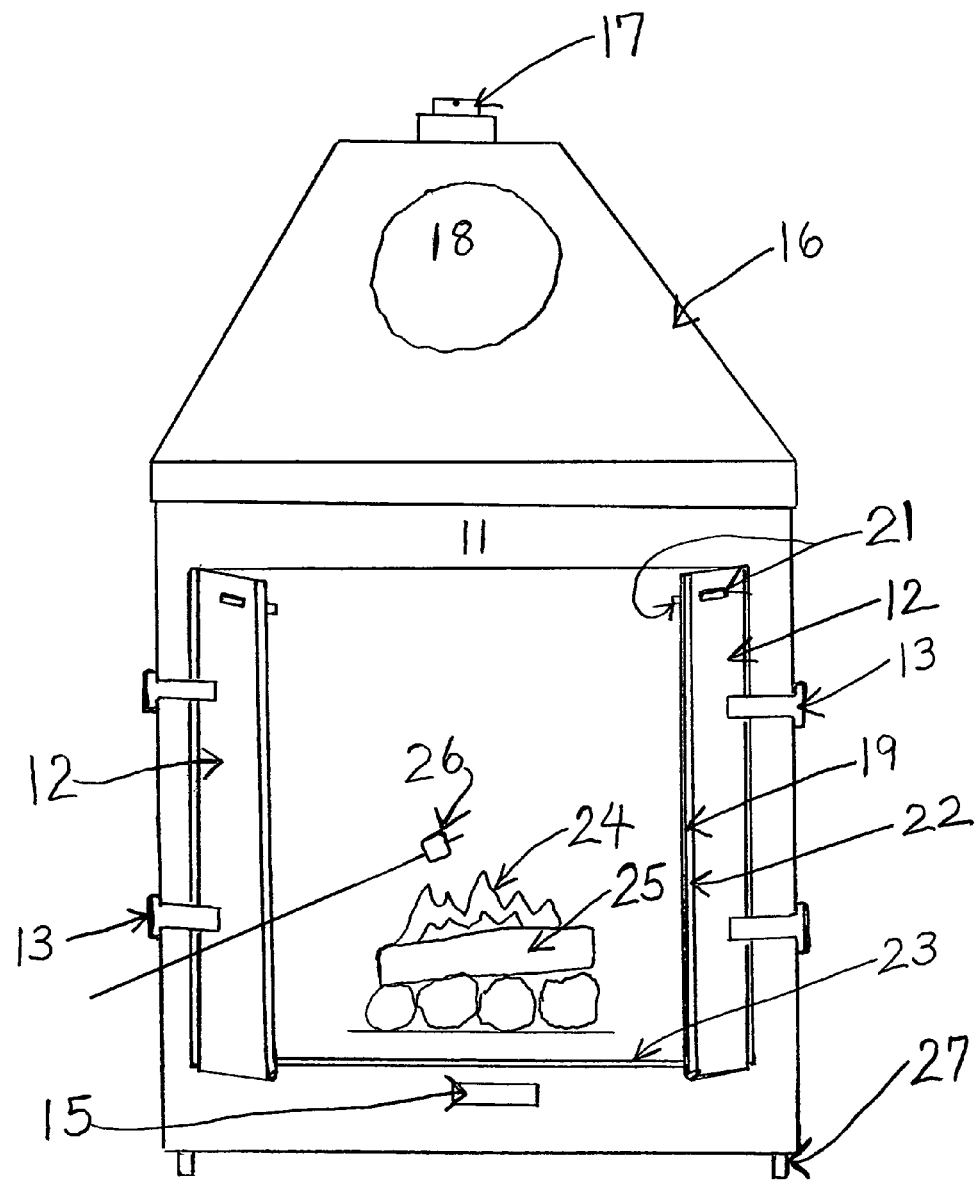

FIG. 2 A front perspective view of combination grill/fireplace cooker with attached fireplace doors open, logs and/or charcoal fuel burning and food/marshmallows being cooked, within the fireplace section, the top lid, chimney/air control damper and grill section cooking area.

Figure 3:
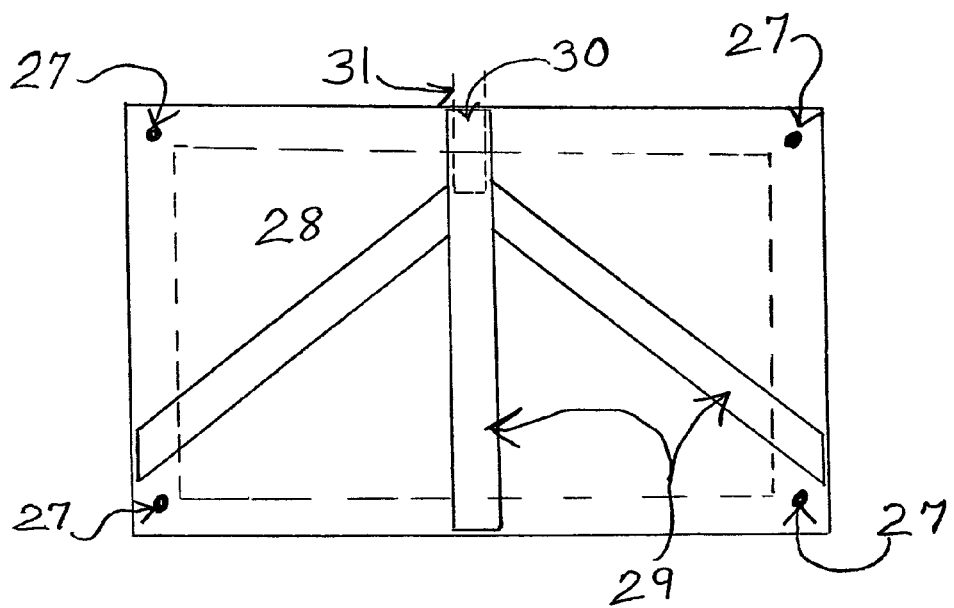

FIG. 3 Shows in an overhead view the bottom of the grill/fireplace with the trailer hitch receiver framework.

Figure 4:
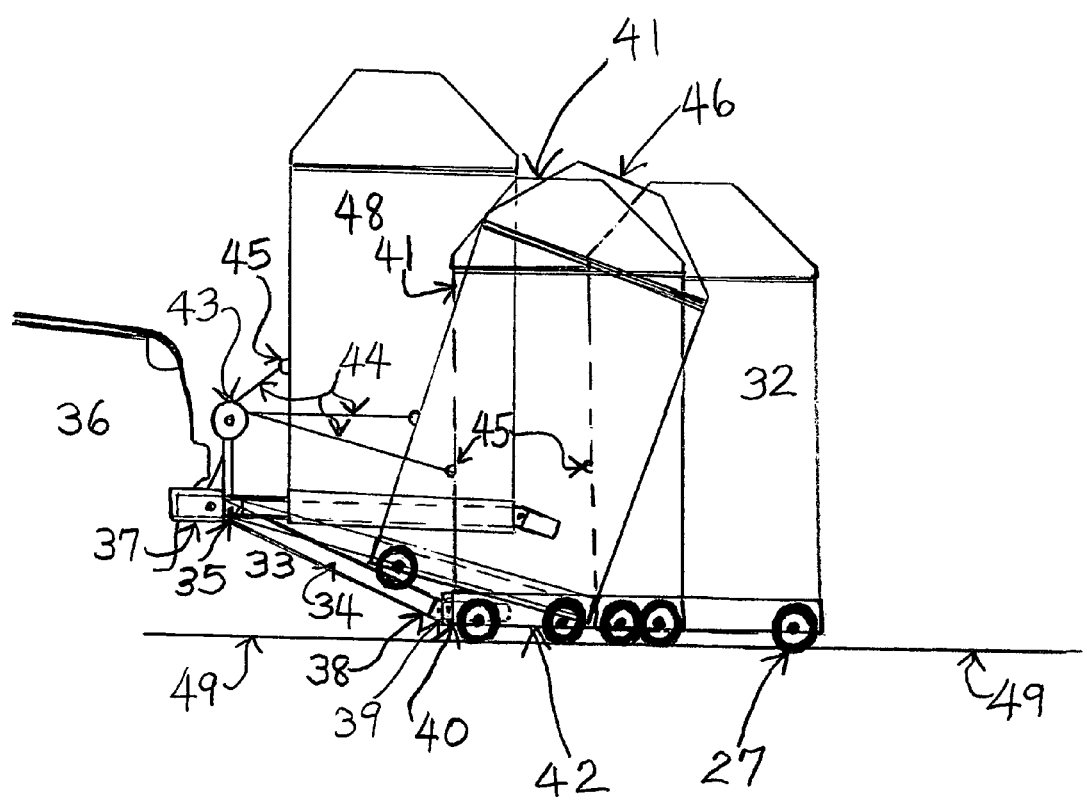

Shown in FIG. 4 is a side perspective view, of the "crank-slide" system with the crank-slide tongue attached to the vehicle hitch receiver and attached at its other end to the grill/fireplace bottom framework receiver.

DETAILED DESCRIPTION OF THE INVENTION

Shown in FIG. 1. in a front perspective view, is the combination outdoor" grill cooker and fireplace. In the lower section 11 of the grill/fireplace are closed attached fireplace doors 12 with the door hinges 13 and door opener/closers 14. Below the attached doors is the intake air control damper/ash 10 cleanout 15. The lid 16 and chimney/upper air damper 17 are shown in the grill cooking area 18. Fire resistant material 19 is placed to assist in sealing air movement through the fireplace doors 12 when closed and secured by the door opener/closers 14. Pictured inside the lid 16 is the cooking grill 20 for grill style grilling/smoking.

FIG. 2. shows in a front perspective view the combination grill/fireplace with attached fireplace doors 12 opened. The inside part of the door opener/closer 21 and hinges 13 can be seen. Fire resistant air seal material 19 is shown adhered on the door edges 22 or on the circumference of the opening 23 of the lower fireplace section 11. The flaming fire 24 is seen above the burning fuel 25, such as charcoal or wooden logs, and food/marshmallows 26 being cooked over the fire 24. Also shown are wheel casters 27 attached underneath the outdoor grill/fireplace. The intake air damper/ash cleanout 15 is shown below the lower fireplace section 11. The lid 16 and chimney/upper air damper 17 are shown as part of the upper grill cooking area 18.

FIG. 3 in a perspective overhead view shows the grill/fireplace bottom 28 with the trailer hitch carrying framework 29. The receiver opening 30 of the trailer hitch carrying framework 29 is shown that accepts a hitch connecter tongue 31. Also shown is the location of caster wheels 27.

Shown in FIG. 4 is a side perspective view of the combination outdoor grill/fireplace 32 being rolled up with caster wheels 27 to the crank-slide system 33. The crank-slide tongue 34, having a flexible jointed end 35, is placed into the grill/fireplace carrying vehicle 36 hitch receiver 37. The other end of the crank-slide tongue 38, with flexible end joints 39, is placed into the receiver opening 40 of the outdoor grill/fireplace 41 trailer hitch carrying framework 42. A cranking mechanism 43 is placed above and attached to the carrying vehicle hitch receiver 37 and/or crank-slide tongue 34—with the crank extended wire or strapping 44 attached to the grill/fireplace attaching point 45. The cranking mechanism 43 pulls and slides the grill/fireplace 46 up the crank-slide tongue 34 as the rear caster wheels 47 on the bottom of the grill/fireplace 46 help "roll "the grill/fireplace 46 up the crank-slide tongue 34. When the grill/fireplace 48 reaches a near horizontal position to the ground surface 49 the crank-slide tongue flex end 35 is locked into place to hold the outdoor grill/fireplace 46, along with the crank mechanism wire or strapping 44, secure for transporting.

The invention claimed is:

1. A combination manufactured grill, cooker and fireplace, comprising:

a. a lower insulated fuel burning and cooking fireplace section comprising at least one access door, a fire box, an air intake damper, and can include one or more; casters on a bottom side thereof, an ash cleanout, an inside rack holder, a rack, a log holder, a gas burner, a gas log, and a side rack; and b. an upper insulated grill cooker section comprising a lid, at least one grilling/warming rack, an air control damper and one or more of a handle, chimney, and can include a lid lock down; wherein, c. with the at least one access door open, a user is able to place, attend, and remove fuel burning sources and food items placed in the lower fuel burning and cooking fireplace section; and d. when the at least one access door is closed, most, if not all, air can be sealed from the combination manufactured grill, cooker and fireplace such that air flow can be controlled by the lower air intake damper and the upper air control damper; wherein, e. the lower fuel burning and cooking fireplace section and upper grill cooker section can be used individually or simultaneously; and f. an amount of insulation in the lower fuel burning and cooking fireplace section and upper grill cooker section determines how close the combination manufactured grill and fireplace cooker can be placed to flammable materials; and g. the at least one access door covers an opening formed on a front face of the lower fuel burning and cooking fireplace section, wherein the opening is sized such that it occupies nearly an entire surface area of said front face.

2. The combination manufactured grill, cooker and fireplace of claim 1 is configured to be secured to a carrying vehicle's hitch receiver with a crank slide attachment system, the crank slide attachment system comprising:

a. a bottom attached trailer hitch framework mounted on a bottom side of the manufactured grill, cooker and fireplace; and b. a crank slide receiver tongue having flexible jointed ends at each end thereof; wherein, one flexible jointed end is adapted to be received in the vehicle's hitch receiver, the other flexible jointed end is received in the bottom attached trailer hitch framework; and c. a cranking mechanism with a with flexible wire or strap wound there around, the flexible wire or strap attached to the manufactured grill, cooker and fireplace such that cranking of said cranking mechanism pulls and slides the manufactured grill, cooker and fireplace up the crank slide receiver tongue to a near horizontal position spaced from a ground surface.

3. The combination manufactured grill, cooker and fireplace according claim 2, wherein the combination manufactured grill, cooker and fireplace can be placed back down to the ground surface by reversing the procedures of cranking up the combination manufactured grill, cooker and fireplace up to the vehicle carrying receiver on the crank slide receiver tongue as outlined in claim 2.

4. The combination manufactured grill, cooker and fireplace of claim 1, wherein walls of the lower fuel burning and cooking fireplace section and the upper grill cooker section are formed of either ceramic or metal lined insulation.

* * * * *